US008286478B2

(12) United States Patent
Speldrich

(10) Patent No.: US 8,286,478 B2
(45) Date of Patent: Oct. 16, 2012

(54) SENSOR BRIDGE WITH THERMALLY ISOLATING APERTURES

(75) Inventor: Brian Speldrich, Freeport, IL (US)

(73) Assignee: Honeywell International Inc., Morristown, NJ (US)

(*) Notice: Subject to any disclaimer, the term of this patent is extended or adjusted under 35 U.S.C. 154(b) by 7 days.

(21) Appl. No.: 12/969,403

(22) Filed: Dec. 15, 2010

(65) Prior Publication Data
US 2012/0152014 A1 Jun. 21, 2012

(51) Int. Cl.
*G01F 1/68* (2006.01)
(52) U.S. Cl. .................................. 73/204.23; 73/204.26
(58) Field of Classification Search .................. None
See application file for complete search history.

(56) References Cited

U.S. PATENT DOCUMENTS

| | | | |
|---|---|---|---|
| 4,472,239 A | 9/1984 | Johnson et al. | |
| 4,478,076 A | 10/1984 | Bohrer | |
| 4,478,077 A | 10/1984 | Bohrer et al. | |
| 4,501,144 A | 2/1985 | Higashi et al. | |
| 4,651,564 A | 3/1987 | Johnson et al. | |
| 4,683,159 A | 7/1987 | Bohrer et al. | |
| 4,696,188 A | 9/1987 | Higashi | |
| 4,895,616 A | 1/1990 | Higashi | |
| 4,909,078 A | 3/1990 | Sittler et al. | |
| 4,914,742 A | 4/1990 | Higashi et al. | |
| 5,050,429 A | 9/1991 | Nishimoto et al. | |
| 5,291,781 A * | 3/1994 | Nagata et al. | 73/204.26 |
| 5,321,983 A * | 6/1994 | Nagata | 73/204.18 |
| 5,406,841 A * | 4/1995 | Kimura | 73/204.26 |
| 5,717,136 A * | 2/1998 | Aoi et al. | 73/204.26 |
| 5,804,720 A * | 9/1998 | Morimasa et al. | 73/204.26 |
| 5,852,239 A * | 12/1998 | Sato et al. | 73/204.26 |

(Continued)

FOREIGN PATENT DOCUMENTS

DE 19906100 A1 9/2000

(Continued)

OTHER PUBLICATIONS

Search Report for Corresponding Application No. 11193081.4-2204 Dated Apr. 12, 2012.

*Primary Examiner* — Harshad R Patel
(74) *Attorney, Agent, or Firm* — Seager Tufte & Wickhem LLC

(57) ABSTRACT

A sensor having a sensor bridge supported above a substrate is disclosed. A number of thermally isolating apertures are provided in the sensor bridge to help increase the thermal isolation of the sensor bridge from the substrate. In one illustrative embodiment, a heater element, an upstream sensor element, and/or a downstream sensor element are provided on the sensor bridge. A plurality of apertures may extend through the sensor bridge to thermally isolate the heater element, the upstream and/or downstream sensor element from the substrate and/or from each other. In one illustrative embodiment, the plurality of apertures may be provided at spaced locations adjacent a first lateral side of the sensor bridge, adjacent the second lateral side of the sensor bridge, between the heater element and the upstream sensor element, and/or between the heater element and the downstream sensor element. In some cases, the plurality of apertures may be substantially round, oval, rectangular and/or any other suitable shape.

21 Claims, 4 Drawing Sheets

U.S. PATENT DOCUMENTS

| | | |
|---|---|---|
| 6,184,773 B1 | 2/2001 | Bonne et al. |
| 6,250,150 B1 * | 6/2001 | Azumi ........................ 73/204.26 |
| 6,470,742 B1 * | 10/2002 | Yamakawa et al. ........ 73/204.26 |
| 6,536,274 B1 * | 3/2003 | Zushi et al. ................. 73/204.26 |
| 6,557,411 B1 * | 5/2003 | Yamada et al. ............. 73/204.26 |
| 6,675,644 B2 * | 1/2004 | Yamakawa et al. ........ 73/204.26 |
| 7,255,001 B1 | 8/2007 | Davis et al. |
| 7,278,308 B2 | 10/2007 | Gehman et al. |
| 7,278,309 B2 | 10/2007 | Dmytriw et al. |
| 7,603,898 B2 | 10/2009 | Speldrich |
| 7,752,910 B2 | 7/2010 | Wang et al. |
| 7,892,488 B2 | 2/2011 | Speldrich et al. |
| 2007/0209433 A1 | 9/2007 | Gehman et al. |

FOREIGN PATENT DOCUMENTS

| | | |
|---|---|---|
| EP | 1227326 A2 | 7/2002 |
| EP | 1787946 A2 | 5/2007 |
| WO | 9836247 A1 | 8/1998 |

* cited by examiner

SENSOR BRIDGE WITH THERMALLY ISOLATING APERTURES

FIELD

The present disclosure relates generally to sensors with a sensor bridge supported above a substrate, and more particularly, to methods and structures for increasing the thermal isolation of the sensor bridge from the substrate.

BACKGROUND

Several types of sensors, such as flow sensors as well as other types of sensors include a sensor bridge supported above a substrate. Such sensors can be used in a wide variety of applications including, for example, medical applications, industrial process applications, commercial applications, military applications, combustion control applications, flight control applications, laboratory applications, weather monitoring applications, as well as other applications. In some instances, such sensors can include a heater and/or one or more heat sensors located on the sensor bridge.

SUMMARY

The present disclosure relates generally to sensors with a sensor bridge supported above a substrate. In accordance with this disclosure, and to help increase the sensitivity and/or dynamic range, reduce power consumption, and/or otherwise improve the performance characteristics of the sensors, one or more apertures may be provided in the sensor bridge, which may help thermally isolated the sensor bridge from the substrate.

In one illustrative embodiment, a flow sensor for sensing a flow of a fluid stream is disclosed. While a flow sensor is used here as a primary example, it should be understood that this disclosure can be applied to other types of sensors, and in particular, other types of sensors that include a sensor bridge that is supported above a substrate. The illustrative flow sensor may have a bridge suspended over a substrate, where the substrate has a top surface, and a depression extending into the substrate from the top surface. The depression may have an upstream side, a downstream side, a first lateral side and a second lateral side. During use of the flow sensor, the fluid stream may flow from the upstream side towards the downstream side. In this example, the bridge of the flow sensor may extend across the depression from the first lateral side to the second lateral side. The flow sensor may include a heater element provided on the bridge, a first sensor element provided on the bridge adjacent an upstream side of the heater element, and a second sensor element provided on the bridge adjacent a downstream side of the heater element.

A plurality of apertures may extend through the bridge. The plurality of apertures may be disposed at spaced locations adjacent the first lateral side and/or the second lateral side of the depression. In some cases, the flow sensor may include a plurality of apertures extending through the bridge and disposed at spaced locations between the first lateral side and the second lateral side of the depression, and disposed between the heater element and the first sensor element and/or the second sensor element. In some cases, the plurality of apertures may be disposed at spaced locations in a linear array (regular or irregular). The plurality of apertures may be substantially round, oval, rectangular and/or any other suitable shape.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DETAILED DESCRIPTION

Figure 1:
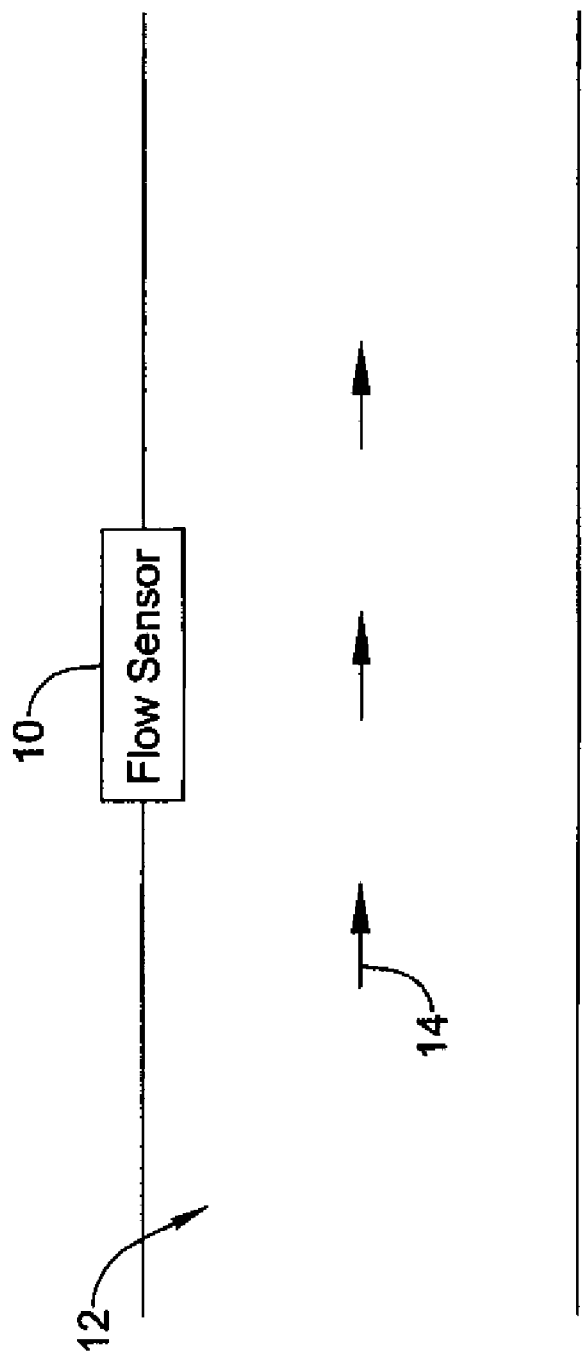
FIG. 1 is a schematic diagram of an illustrative embodiment of a flow sensor for measuring a fluid flow rate of a fluid in a fluid stream.

The following description should be read with reference to the drawings wherein like reference numerals indicate like elements throughout the several views. The detailed description and drawings show several embodiments which are meant to be illustrative in nature.

FIG. 1 is a schematic diagram of an illustrative flow sensor 10 for measuring a fluid flow rate of a fluid 14 in a fluid stream 12. The term "fluid" as used herein can refer to a gas flow or a liquid flow, depending on the application. Also, while a flow sensor is used here as a primary example, it should be understood that this disclosure can be applied to other types of sensors, and in particular, other types of sensors that include a sensor bridge that is supported above a substrate.

In the illustrative embodiment of FIG. 1, the flow sensor 10 may be disposed in or adjacent to the fluid stream 12 to measure one or more properties (e.g. thermal conductivity) of the fluid, and/or fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microsensor, such as a microbridge or a Microbrick™ sensor assembly available from the assignee of the present application, but this is not required. Some illustrative methods and sensor configurations that are suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 4,994,035; 5,050,429; 6,169,965; 6,223,593; 6,234,016; and 6,502,459. It must be recognized, however, that the illustrative flow sensor 10 may be any suitable flow sensor, as desired.

In the illustrative example, the fluid stream 12 may have a range of flow rates of fluid flow 14. For example, the fluid stream 12 may include a high-volume fluid flow, a mid-volume fluid flow, or a low-volume fluid flow. Example fluid flow applications can include, but are not limited to, respirometers for infants and/or adults, flow meters, velocimeters, flight control, industrial process stream, combustion control, weather monitoring, as well as any other suitable fluid flow applications, as desired.

Figure 2:
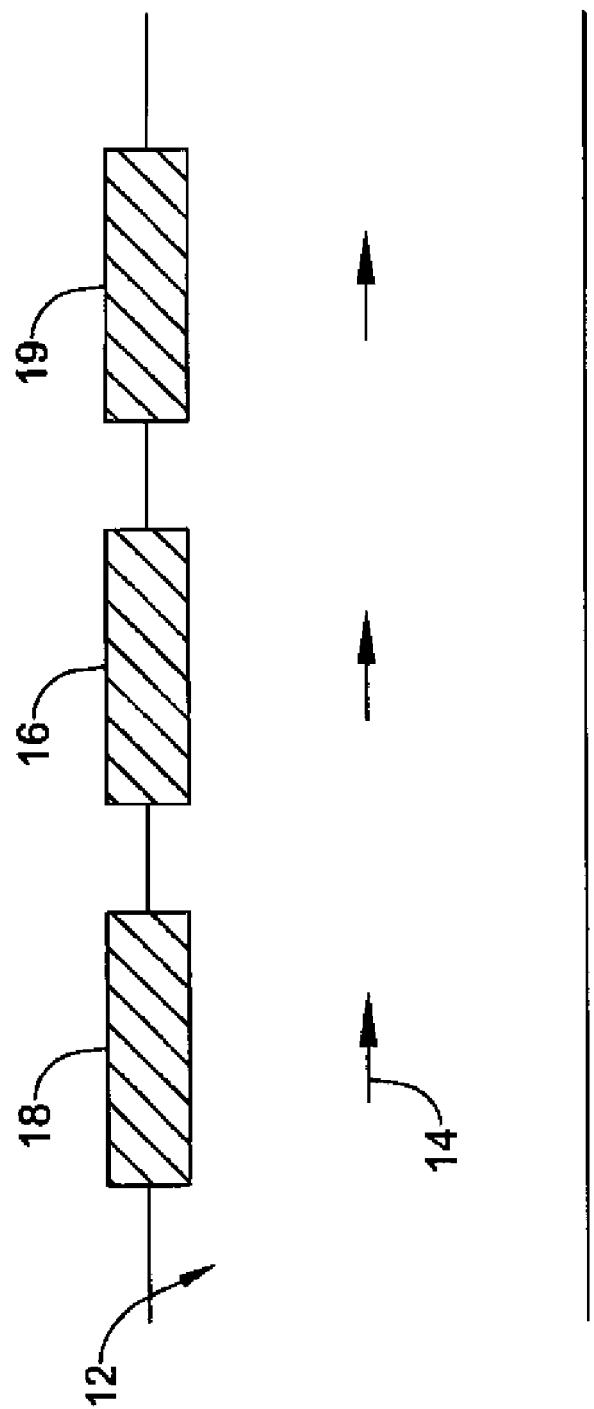
FIG. 2 is a schematic diagram of an illustrative embodiment of a thermal flow sensor assembly for measuring the flow rate of a fluid flow in a fluid stream.

Turning to FIG. 2, which is a schematic diagram of an illustrative embodiment of a thermal flow sensor assembly for measuring the flow rate of a fluid flow 14 in a fluid stream 12. In the illustrative embodiment of FIG. 2, the flow sensor assembly may include one or more heater elements, such as heater element 16, and one or more sensor elements, such as sensor elements 18 and 19. As illustrated, the sensor assembly includes a heater element 16, a first sensor element 18 positioned upstream of the heater element 16, and a second sensor element 19 positioned downstream of the heater element 16. In the example shown, when no fluid flow is present in the fluid stream 12 and the heater element 16 is heated to a temperature higher than the ambient temperature of the fluid in the fluid flow 14, a temperature distribution may be created and transmitted in a generally symmetrical distribution about the heater element 16 both to upstream sensor element 18 and downstream sensor element 19. In this example, upstream sensor element 18 and downstream sensor element 19 may sense the same or similar temperature (e.g. within 25 percent, 10 percent, 5 percent, 1 percent, 0.001 percent, etc.).

When a fluid flow 14 is present in the fluid stream 12 and the heater element 16 is heated to a temperature higher than the ambient temperature of the fluid in the fluid flow 14, the symmetrical temperature distribution may be disturbed and the amount of disturbance may be related to the flow rate of the fluid flow 14 in the fluid stream 12. The flow rate of the fluid flow 14 may cause the upstream sensor element 18 to sense a relatively cooler temperature than the downstream sensor element 19. In other words, the flow rate of the fluid flow 14 may cause a temperature differential between the upstream sensor element 18 and the downstream sensor element 19 that is related to the flow rate of the fluid flow in the fluid stream 12.

In another illustrative embodiment, the mass flow and/or velocity of the fluid flow 14 may be determined by providing a transient elevated temperature condition in the heater element 16, which in turn, causes a transient elevated temperature condition (e.g. heat pulse) in the fluid flow 14. When there is a non-zero flow rate in the fluid flow 14, the upstream sensor element 18 may receive a transient response later than the downstream sensor element 19. The flow rate of the fluid flow 14 can then be computed using the time lag between the upstream sensor element 18 and/or downstream sensor element 19, or between the time the heater is energized and when the corresponding elevated temperature condition (e.g. heat pulse) is sensed by one of the sensors, such as the downstream sensor 19.

Figure 3:
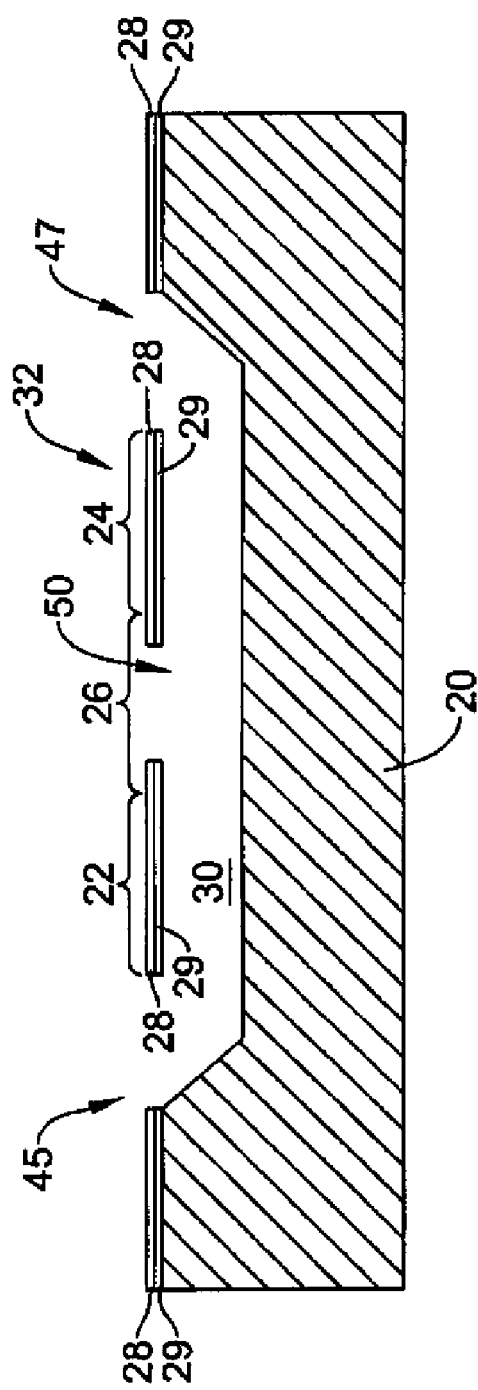
FIG. 3 is a cross-sectional view of an illustrative embodiment of a thermal flow sensor for measuring the flow rate of a fluid flow.
Figure 4:
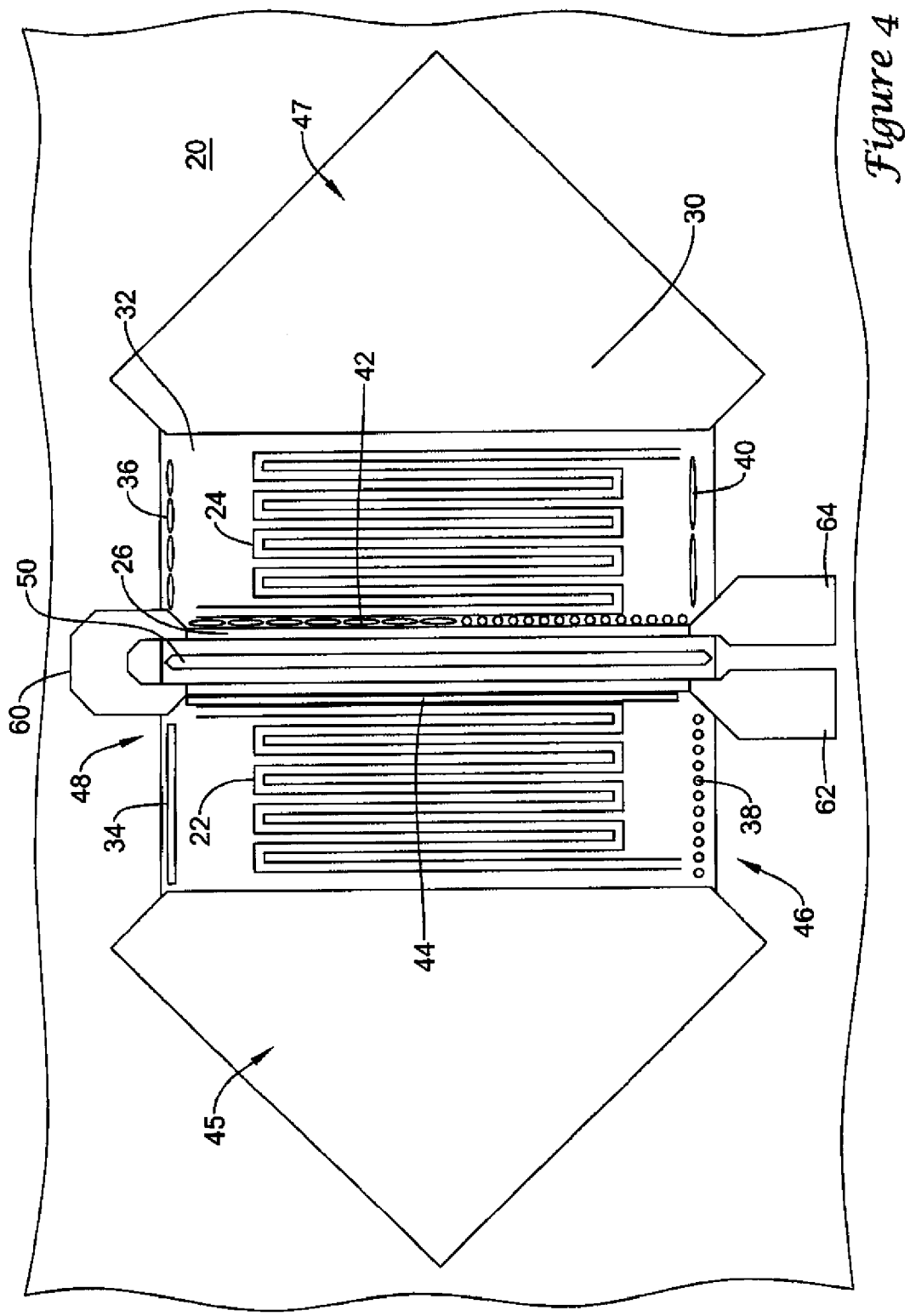
FIG. 4 is a top view of the illustrative thermal flow sensor shown in FIG. 3.

FIGS. 3 and 4 are a cross-sectional side view and a top view, respectively, of an illustrative thermal flow sensor for measuring the flow rate of a fluid flow. In the illustrative embodiment, the flow sensor may include a heater element 26, a first temperature sensor 22 positioned upstream of the heater element 26, and a second temperature sensor 24 positioned downstream of the heater element 26. In the illustrative embodiment, a substrate 20 is provided to support the temperature sensors 22 and 24 and heater element 26. The substrate 20 may include a typical semiconductor material, such as, for example, silicon, however, other suitable materials may be used.

As shown in FIG. 3, the substrate 20 may define a depression 30, or fluid space, formed in a top surface of the substrate 20. The depression 30 may have an upstream side 45, a downstream side 47, and one or more lateral sides 46 and 48 (see FIG. 4). During use, a fluid stream may flow from the upstream side 45 towards the downstream side 47 of the depression 30. The depression 30 may be formed using any suitable microfabrication technique including, for example, wet etching. However, other suitable microfabrication techniques may be used to form depression 30, as desired.

In the illustrative embodiment, a supporting member 32, such as a sensor bridge, may be fabricated to be supported above and extend across the depression 30, and may support temperature sensors 22 and 24 and/or heater element 26. As shown in FIG. 4, the sensor bridge 32 may extend between the first lateral 46 side of the depression 30 and the second lateral side 48 of the depression 30, while leaving the upstream side 45 and the downstream side 47 of the depression 30 open to receive a fluid stream. While the supporting member 32 is shown as a sensor bridge supported on both lateral sides 46 and 48, it is contemplated that supporting member 32 may be cantilevered over depression 30, or otherwise supported over substrate 20, as desired.

In some embodiments, temperature sensors 22 and 24 may be thin film temperature sensors defined, at least in part, by sensing resistor grids. As shown in FIG. 4, the temperature sensors 22 and 24 may be formed as resistive traces supported by the sensor bridge 32. In the illustrative embodiment, temperature sensors 22 and 24 may include any suitable metal or metal alloy film. One example metal that may be used is a nickel-iron alloy, sometimes referred to as permalloy, with an illustrative composition of 80 percent nickel and 20 percent iron. However, other suitable compositions may be used. In some cases, the sensor grids may be encapsulated in a thin film of dielectric, such as silicon nitride, $Si_3N_4$, including layers 28 and 29 (see FIG. 3). However, other suitable dielectrics materials may be used, if desired.

In some embodiments, the heater element 26 may be a thin film heater defined, at least in part, by a heater resistor grid. As shown in FIG. 4, the heater element 26 may be formed as a resistive trace supported by the sensor bridge 32. However, it is contemplated that heater element 26 may be of any shape including a grid pattern as described above, or simply a line, as desired. Heater element 26 may be fabricated of any suitable metal or metal alloy such as, for example, platinum, nickel, and iron-nickel. Similar to the temperature sensors 22 and 24, the heater element 26 may be encapsulated in a thin film of dielectric, such as silicon nitride $Si_3N_4$, if desired.

In some embodiments, the supporting member or sensor bridge 32 may include an opening 50 formed therein with one-half of the heater 26 on each side (upstream and downstream) of the opening 50. In some cases, the opening 50 may facilitate formation of the depression 30 via, for example, wet etching. As shown in FIG. 4, the heater element 26 may include a conductive trace 60 adjacent the lateral side surface 48 of the depression 30 to electrically connect the resistive traces of the heater element 26 on each side of opening 50. In some cases, conductive traces 62 and 64, or leads, may be provided adjacent lateral side 46 of depression electrically connected to heater element 26.

In one example embodiment, temperature sensors 22 and 24 and heater element 26 may be formed to have a thicknesses of approximately 0.08 to 0.12 micron with line widths on the order of about 5 microns with spaces between lines on the order of 5 microns. However, these dimensions are merely illustrative and it is contemplated that other thicknesses and widths may be used, as desired.

In some embodiments, in operation, when no fluid flow is present in the fluid stream and the heater element 26 is heated to a temperature higher than the ambient temperature of the fluid in the fluid flow in the depression 30, a temperature distribution may be created and transmitted in a generally symmetrical distribution about the heater element 26 to upstream sensor element 22 and downstream sensor element 24. In this example, upstream sensor element 22 and downstream sensor element 24 may sense the same or similar temperature (e.g. within 25 percent, 10 percent, 5 percent, 1 percent, 0.001 percent, etc.). When a fluid flow is present in the depression 30, and the heater element 26 is heated to a temperature higher than the ambient temperature of the fluid in the fluid flow, the symmetrical temperature distribution may be disturbed and the amount of disturbance may be related to the flow rate of the fluid flow passing through the depression 30. The flow rate of the fluid flow may cause the upstream sensor element 22 to sense a relatively cooler temperature than the downstream sensor element 24. In other words, the flow rate of the fluid flow may cause a temperature differential between the upstream sensor element 22 and the downstream sensor element 24 that is related to the flow rate of the fluid flow in the fluid stream. However, it is contemplated that other sensing configurations may be used.

In some embodiments, heater element 26 may be configured to operate at an average temperature of about 100 to several hundred degrees Centigrade above the ambient fluid stream temperature. When operated at a temperature of 200 degrees Centigrade above ambient, the power required by heater element 26 may be less than 0.010 watts.

In the illustrative embodiment, the supporting member or sensor bridge 32 may be formed to include a plurality of apertures 34, 36, 38, 40, 42, and 44 extending therethrough to help thermally isolate the heater element 26 from the surrounding substrate 20 and/or from the adjacent temperatures sensors 22 and 24. This may help increase the sensitivity and/or dynamic range, reduce power consumption, and/or otherwise improve the performance characteristics of the sensor. For example, reducing the heat lost from the heater element 26 on the sensor bridge 32 may reduce the power consumption of the flow sensor. Also, thermally isolating the heater element 26 from the temperature sensors 22 and 24, and/or thermally isolating the temperature sensors 22 and 24 from the substrate 20, may help improve the sensitivity and/or dynamic range of the sensor.

In some embodiments, the plurality of apertures 34, 36, 38, and 40 may be disposed at spaced locations adjacent the lateral side 46 and/or 48 of the depression 30. When so provided, the plurality of apertures 34, 36, 38, and 40 may help to thermally isolate the heater element 26 and/or temperature sensors 22 and 24 provided on the sensor bridge 32 from the surrounding substrate 20. As shown in FIG. 4, the plurality of aperture 34, 36, 38, and 40 may be disposed adjacent lateral side 46 and lateral side 48, however, it is contemplated that only some of the plurality of apertures 34, 36, 38, and/or 40 adjacent lateral sides 46 and/or 48 may be provided, as desired. As shown, the plurality of apertures 34, 36, 38, and 40 may be configured in a direction that is substantially parallel to the direction of fluid flow of the fluid stream through depression. In some cases, each of the plurality of aperture sets 34, 36, 38, and 40 may be considered an array of apertures having an array length that extends in a direction generally along the first lateral side 46 and/or the second lateral side 48 of the depression 30. In some cases, the array of apertures 34, 36, 38, and 40 may be a regular array or an irregular array that may meander following an etch pattern along the side wall of the depression 30.

As shown in FIG. 4, apertures 34 and 36 may extend along the length (in the direction of the fluid flow) of the temperature sensor 22 and temperature sensor 24, respectively, adjacent lateral side 48 of depression 30. However, it is contemplated that apertures 34 and 36 may extend along only a portion of the length of the temperature sensors 22 and 24, if desired. Aperture 34 is shown as being generally rectangular in shape, and apertures 36 are shown as being generally oval in shape. However, it is contemplated that other shapes may be used, as desired. It is also contemplated that the aperture 34 and apertures 36 may be the same (e.g. both may be arrays of ovals) or different (as shown in FIG. 4). Also, while the corners of rectangular shaped aperture 34 are shown square, it is contemplated that the corners may be rounded. As shown in FIG. 4, one aperture 34 and four apertures 36 are provided extending through the supporting member or sensor bridge 32, however, it is contemplated that other numbers of apertures 34 and 36 may be used, such as two, three, four, five, six, seven, eight, nine, ten, or more apertures, as desired.

In some cases, providing two or more apertures as shown at 36 rather than a single long aperture as shown at 34 may not only help thermally isolate the sensor bridge 32 from the substrate 20, but may also provide some intermediate support along the length (in the direction of the fluid flow) apertures 36. The intermediate support may be between the sensor bridge 32 and the substrate 20 between the individual apertures. In some applications, this intermediate support may increase the durability of the sensor bridge 32, and in some cases, may help keep the sensor bridge 32 planar.

As shown in FIG. 4, apertures 38 and 40 may be spaced apart along the length (in the direction of the fluid flow) of the temperature sensor 22 and temperature sensor 24, respectively, adjacent lateral side 46 of depression. Apertures 38 are shown as being generally circular in shape, and apertures 40 are shown as being generally oval in shape, but these are only illustrative, and are used to show the variety that may be used. Other shapes may also be used, as desired. As shown, eleven apertures 38 and two apertures 40 extend through the supporting member 32, however, other numbers of apertures may be used, such as one, two, three, four, five, six, seven, eight, nine, ten, twelve, thirteen, or more apertures, as desired.

While apertures 34, 36, 38, and 40 are shown as different shaped and/or sizes, it is contemplated that apertures 34, 36, 38, and 40 positioned along lateral sides 46 and 48 of depression 30 may be formed to have the same shape and/or size or different shapes and sizes, as desired. It is contemplated that any shape and size or combination of shapes and sizes may be used, or, in other words, the configuration of apertures 34, 36, 38, and 40 may be mixed and matched, as desired.

In some embodiments, the supporting member or sensor bridge 32 may be formed to include a plurality of apertures 42 and 44 positioned between the heater element 26 and temperature sensor 22 and/or temperature sensor 24. Apertures 42 and 44 may help thermally isolate temperature sensor 22 and/or temperature sensor 24 from heater element 26. As shown in FIG. 4, aperture 44 may be positioned between temperature sensor 22 and heater element 26 and apertures 46 may be positioned between temperature sensor 24 and heater element 26. In some cases, aperture 44 may be generally rectangular in shape and may extend a width (in the direction perpendicular to the fluid flow) of the temperature sensor 22. As shown, apertures 42 may include some apertures that are generally oval in shape and other apertures are generally round in shape, but these are just examples. Apertures 42 may be configured to extend a width (in the direction perpendicular to the fluid flow) of the temperature sensor 24. As shown, only one aperture 44 and twenty-two apertures 42 are shown, however, it is contemplated that other numbers of apertures 42 and 44 may be provided, as desired.

While apertures 42 and 44 are shown as different shapes and/or sizes, it is contemplated that apertures 42 and 44 may be formed to have the same shape and size or different shapes and sizes. It is contemplated that any shape and size or combination of shapes and sizes may be used, as desired or, in other words, apertures 42 and 44 may be mixed and matched, as desired. Furthermore, it is contemplated that only some of apertures 34, 36, 38, 40, 42, and 44 may be provided, as desired.

As shown in FIG. 4, and when provided, conductive traces 62 and 64 of the heater element 26 may be positioned to pass between apertures 38 and 40 on the supporting member 32 along lateral side 46 of depression. Similarly, conductive trace 60 may be configured to pass between apertures 34 and 38 along lateral side 48 of depression 30. Although not shown, it is contemplated that one or more conductive traces, or leads, may be provided for temperature sensors 22 and 24, which may also be positioned to pass between two or more apertures 34, 36, 38, and/or 40.

In some embodiments, the apertures 34, 36, 38, 40, 42, and 44 may be fabricated using any suitable microfabrication technique, as desired. One example fabrication process may include providing a (100) silicon wafer 20 having a top surface. In some instances, the top surface may have a layer 29 of silicon nitride deposited thereon using a standard sputtering techniques in a low pressure gas discharge environment. In one example, layer 29 may be about 4000 angstroms thick, however other thicknesses may be used. Next, a layer of permalloy, which may be, for example, 80 percent nickel and 20 percent iron, may be deposited on the silicon nitride by sputtering or other suitable technique. In one example, the permalloy may be about 800 angstroms thick, however, other thicknesses may be used. Temperature sensors 22 and 24 and heater element 26 may be delineated using a suitable photo mask, a photo resist, and a suitable etchant.

In some cases, a second layer 28 of silicon nitride may be sputter-deposited to provide complete step coverage of the permalloy configuration and protect the resistive elements from oxidation. In some cases, layer 28 may be about 4000 angstroms thick, however, other thicknesses may be used.

Then, in some cases, opening 50 may be etched through the nitride layer to the (100) silicon surface. Next, a masking layer may be deposited on the layer 28 to define the depression 30 and apertures 34, 36, 38, 40, 42, and/or 44. An anisotropic may be used to etch out the silicon to form depression 30 beneath the supporting member 32 and to form apertures 34, 36, 38, 40, 42, and/or 44 in the supporting member 32. In this illustrated example, apertures 34, 36, 38, 40, 42, and 44 may be formed in the same processing step(s) as the depression 30, however, it is contemplated that apertures 34, 36, 38, 49, 42, and 44 may be formed in separate processing steps, if desired. One suitable etchant is KOH plus isopropyl alcohol, however, other suitable etchants may be used, as desired. The depth of depression 30 may be defined according to the length of duration of the etching step. In some cases, a doped silicon etch stop, e.g., a boron-doped layer, may also be used to control the depth of the depression, although such stops are not required.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure.

What is claimed is:

1. A flow sensor for sensing a flow of a fluid stream, the flow sensor comprising:
   a substrate having a top surface;
   a depression extending into the substrate from the top surface, the depression having an upstream side, a downstream side, a first lateral side and a second lateral side, wherein during use of the flow sensor, the fluid stream flows from the upstream side towards the downstream side;
   a bridge extending across the depression from the first lateral side of the depression to the second lateral side, the bridge being supported by the substrate adjacent the first lateral side and the second lateral side of the depression, wherein the bridge includes first and second lateral sides extending substantially parallel to a direction of fluid flow, and a leading edge and a spaced trailing edge each extending from the first lateral side to the second lateral side of the depression, the leading edge of the bridge being spaced apart from the upstream side of the depression defining a fluid inlet and the trailing edge of the bridge being spaced apart from the downstream side of the depression defining a fluid outlet;
   a heater element provided on the bridge;
   a first sensor element provided on the bridge adjacent an upstream side of the heater element;
   a second sensor element provided on the bridge adjacent a downstream side of the heater element; and
   a plurality of apertures extending through the bridge, the plurality of apertures disposed at spaced locations adjacent the first lateral side of the depression along a direction that is substantially parallel to the direction of fluid flow.

2. The flow sensor of claim 1, further comprising a plurality of apertures extending through the bridge at spaced locations adjacent the second lateral side of the depression.

3. The flow sensor of claim 1, further comprising a plurality of apertures extending through the bridge and disposed at spaced locations between the first lateral side and the second lateral side of the depression, and disposed between the heater element and the first sensor element.

4. The flow sensor of claim 1, further comprising a plurality of apertures extending through the bridge and disposed at spaced locations between the first lateral side and the second lateral side of the depression, and disposed between the heater element and the second sensor element.

5. The flow sensor of claim 1, wherein the plurality of apertures are disposed at spaced locations in a linear array.

6. The flow sensor of claim 1, further including a first conductive trace supported by the bridge extending from the heater element toward the first lateral side of the depression, the first conductive trace passing between two of the plurality of apertures.

7. The flow sensor of claim 6, further including a second conductive trace supported by the bridge extending from the first sensor element toward the first lateral side of the depression, the second conductive trace passing between two of the plurality of apertures.

8. The flow sensor of claim 6, further including a third conductive trace supported by the bridge extending from the second sensor element toward the first lateral side of the depression, the third conductive trace passing between two of the plurality of apertures.

9. The flow sensor of claim 1, wherein each of the plurality of apertures are substantially round in shape.

10. The flow sensor of claim 1, wherein each of the plurality of apertures are substantially oval in shape.

11. The flow sensor of claim 1, wherein each of the plurality of apertures are substantially rectangle in shape.

12. A flow sensor for sensing a flow of a fluid stream, the flow sensor comprising:
   a substrate;
   a bridge having an upstream side, a downstream side, a first lateral side and a second lateral side, wherein during use of the flow sensor, the fluid stream flows in a direction from the upstream side towards the downstream side of the bridge, and wherein the first and second lateral sides of the bridge extend substantially parallel to a direction of fluid flow;

the bridge is spaced from the substrate between the upstream side and the downstream side of the bridge, and is also spaced from the substrate between the first lateral side and the second lateral side of the bridge, the bridge being supported by the substrate adjacent the first lateral side and the second lateral side of the bridge;

a heater element supported by the bridge;

a first sensor element supported by the bridge adjacent the heater element; and a plurality of spaced apertures extending through the bridge, the plurality of spaced apertures spaced from one another in a direction that is substantially parallel to the direction of fluid flow of the fluid stream.

13. The flow sensor of claim 12, wherein the plurality of spaced apertures are disposed along and adjacent to the first lateral side of the bridge.

14. The flow sensor of claim 12, wherein the first sensor element is positioned upstream of the heater element.

15. The flow sensor of claim 14, further comprising a second sensor element supported by the bridge downstream of the heater element.

16. The flow sensor of claim 12, further including a conductive trace supported by the bridge extending from the heater element toward the first lateral side of the bridge, the conductive trace passing between two of the plurality of spaced apertures.

17. The flow sensor of claim 12, further including a conductive trace supported by the bridge extending from the first sensor element toward the first lateral side of the bridge, the conductive trace passing between two of the plurality of spaced apertures.

18. The flow sensor of claim 12, wherein at least some of the plurality of spaced apertures are round in shape.

19. A flow sensor for sensing a flow of a fluid stream, the flow sensor comprising:

a substrate having a top surface;

a depression extending into the substrate from the top surface, the depression having an upstream side, a downstream side, a first lateral side and a second lateral side, wherein during use of the flow sensor, the fluid stream flows from the upstream side towards the downstream side, and wherein the first and second lateral sides of the depression extend parallel to a direction of fluid flow;

a bridge extending across the depression from the first lateral side of the depression to the second lateral side, the bridge being supported by the substrate adjacent the first lateral side and the second lateral side of the depression and having a leading edge and a trailing edge extending from the first lateral side to the second lateral side of the depression, the leading edge of the bridge being spaced apart from the upstream side of the depression defining a fluid inlet and the trailing edge of the bridge being spaced apart from the downstream side of the depression defining a fluid outlet;

a heater element supported by the bridge;

a sensor element supported by the bridge adjacent the heater element; and an array of apertures extending through the bridge, the array of apertures having an array length that extends in a direction generally from the first lateral side toward the second lateral side of the depression, the array of apertures is further situated between the heater element and the sensor element.

20. The flow sensor of claim 19, wherein the array of apertures is a regular array of apertures.

21. The flow sensor of claim 20, wherein the array of apertures is an irregular array of apertures.

* * * * *